United States Patent [19]
Tomcuecik et al.

[11] 3,905,974
[45] Sept. 16, 1975

[54] 6-SUBSTITUTED OXO AND THIO-3-NITROIMIDAZO[1,2-b]-PYRIDAZINES AND METHODS OF PREPARING SAME

[75] Inventors: Andrew Stephen Tomcuecik, Old Tappan, N.J.; Patrick Thomas Izzo; Paul Frank Fabio, both of Pearl River, N.Y.

[73] Assignee: American Cyanamid Company, Stamford, Conn.

[22] Filed: Jan. 29, 1974

[21] Appl. No.: 437,546

Related U.S. Application Data

[63] Continuation-in-part of Ser. No. 293,234, Sept. 28, 1972, Pat. No. 3,828,041, which is a continuation-in-part of Ser. Nos. 118,508, Feb. 24, 1971, abandoned, and Ser. No. 118,510, Feb. 24, 1971, abandoned.

[52] U.S. Cl. ........................ 260/250 AC; 424/250
[51] Int. Cl.² ..................................... C07D 237/26
[58] Field of Search ............................ 260/250 AC

[56] References Cited
UNITED STATES PATENTS

| | | |
|---|---|---|
| 3,489,755 | 1/1970 | Lombardino............ 260/250 AC X |
| 3,725,407 | 4/1973 | Tomcufcik et al.......... 260/250 AC |

*Primary Examiner*—Donald G. Daus
*Assistant Examiner*—Anne Marie T. Tighe
*Attorney, Agent, or Firm*—Ernest Y. Miller

[57] ABSTRACT

The preparation of 6-substituted oxo or thio-3-nitroimidazo[1,2-b]pyridazines which may have a substituent in the 2-position are described. One method is the nitration in the 3-position of the substituted imidazo[1,2-b]pyridazine to give the desired product. Other methods are described. The compounds are useful for their anti-protozoal activity particularly as anti-amebic and anti-trichomonal agents.

9 Claims, No Drawings

6-SUBSTITUTED OXO AND THIO-3-NITROIMIDAZO(1,2-B)-PYRIDAZINES AND METHODS OF PREPARING SAME

This application is a continuation-in-part of application Ser. No. 293,234, filed Sept. 28, 1972, now U.S. Pat. No. 3,828,041 which in turn is a continuation-in-part of application Ser. Nos. 118,508, filed Feb. 24, 1971, now abandoned and application Ser. No. 118,510, filed Feb. 24, 1971 now abandoned.

SUMMARY OF THE INVENTION

This invention relates to 6-mono or 2,6-disubstituted 3-nitroimidazo[1,2-b]pyridazines and methods of preparing the same.

The compounds of this invention may be illustrated by the following formula:

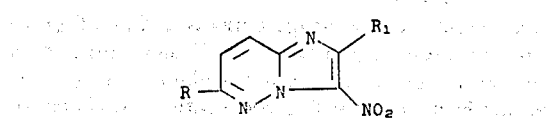

wherein R is hydroxy, mercapto, alkoxy ($C_1$–$C_8$), alkylthio ($C_1$–$C_8$), phthalimidoloweralkoxy, phenylloweralkoxy, lower alkylaminoloweralkoxy, lower alkoxyloweralkoxy, hydroxyloweralkoxy, lower alkenyloxy, halobenzoylloweralkoxy and $R_1$ is hydrogen or lower alkyl.

In the above compounds, lower alkyl are those having 1 to 4 carbon atoms; lower alkenyl those having 2 to 4 carbon atoms; lower alkoxy those having 1 to 4 carbon atoms; lower alkanoyl those having 1 to 4 carbon atoms in addition to the carbonyl group and halo those having chlorine, bromine, iodine and flourine present. The compounds are in general, crystalline.

The present compounds can be prepared by the following methods:

A. The reaction of 6-mono or 2,6-disubstitutedimidazo[1,2-b]pyridazines with nitric and sulfuric acid which can be illustrated as follows:

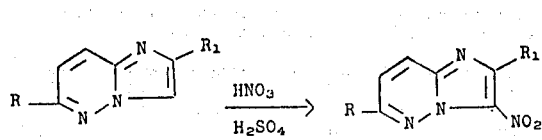

wherein R and $R_1$, are as hereinbefore defined. The reaction can be carried out at a temperature of from 20°C. to about 75°C. It is preferable to use about 70% nitric acid with about 96% sulfuric acid. When the reaction is carried out above room temperature, then lower concentrations of acids are suitable.

B. In the reaction to produce oxo or thio derivatives of a 6-halo-2-substituted or unsubstituted 3-nitroimidazo[2,1-b]-pyridazine is reacted with an alkali metal salt which is illustrated as follows:

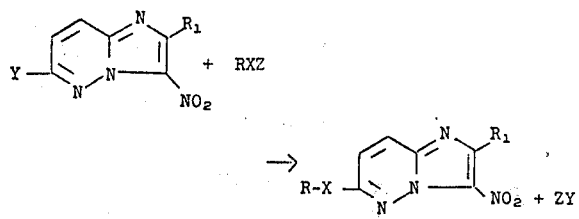

wherein R and $R_1$ are as defined hereinbefore and X is oxygen or sulfur, Y is halogen and Z is an alkali metal. This reaction is preferably carried out in a solvent such as methanol, ethanol, propanol, butanol, dioxane and the like. The temperature at which the reaction is conducted is not critical and may vary from 15°C. to about 60°C. no advantage is generally noted by carrying out the reaction above room temperature.

C. The reaction of a 6-alkali metal oxo or thio-2-substituted or unsubstituted 3-nitroimidazo[1,2-b]pyridazine with a halogen compound is illustrated as follows:

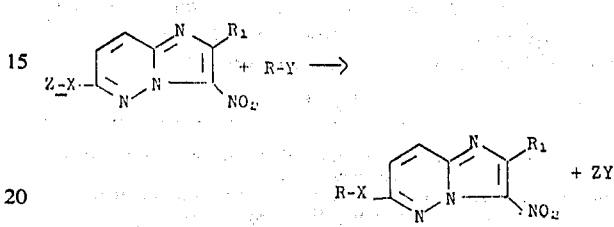

wherein R, $R_1$, X, Y and Z are as hereinbefore defined. This reaction is carried out under conditions similar to that described for reaction B.

The present compounds are useful for their antiprotozoal activity such as anti-trichomonal and anti-amebic activity in warm-blooded animals. They may be used orally or parenterally in dosages in the range of from about 0.5 mg. to 30 mg. per kilogram of warm-blooded animal per day. They can be formulated with the usual pharmaceutical carriers.

The amebicidal properties of the present compounds are measured by means of an assay devised from W. R. Jones, "The Experimental Infection of Rats with *Entamoeba Histolytica* and a Method for Evaluating the Anti-Amoebic Properties of New Compounds", *Annals of Tropical Medicine and Parasitology*, volume 40, pages 130–140 (1946). The assay is carried out as follows:

The test organism is *Entamoeba histolytic* NIH 200 μ. Cultures are maintained on Cleveland Collier liver infusion medium with serum saline 1:1 overlay in 3 × 5 test tube slants. Rice powder is added as a growth factor. Cultures are transferred at 5 day intervals and kept at 37°C. A 48 hour culture is used for the test inoculum and harvested the morning of the test by collecting the sediment containing rice powder and amoebae found at the junction of the butt and the slant. The amoebae are counted and the amount of inoculum for injection is adjusted to contain approximately 200,000 to 250,000 amoebae. Female Wistar strain albino rats from the Royalhart Farms weighing 20–35 grams are used. The cecum is exposed during laporatomy and the amoebae-rich inoculum is injected into the anterior section. The incision is closed with autoclips. Procedures are sterile throughout the course of the surgery. The infected rats are divided randomly into groups of 10. Treatment is begun on the day of infection. Drugs are premixed in a standard laboratory feed sold as Purina Lab. Chow by the Ralston Purina Company. Rats are maintained on the drug diet for five days at the end of which they are necropsied and the cecum examined both macroscopically for pathologic feature of infection and microscopically for the presence of amoebae. Scores of one each are recorded for evidences of mucous, fibrosus, and lesions of inflammation. A score of one is recorded for a finding of 1–20 amoeba and a score of 2 for a finding of more than 20 amoeba on a standard slide preparation. Total score of 0–5, thus, is possible per rat at necropsy. The arithmetic mean of the combined A.D.I.'s (Average Degree of Infection in a test or control group of rats is considered to be the group ADI. Activities are expressed in percent of suppression of group ADI of a test group to the group ADI or a control group. Consumption of test compound is determined from the weight of feed consumed. For example, the compounds 6-methoxy-3-nitroimidazo[1,2-b]pyridazine and 6-ethoxy-3-nitroimidazo[1,2-b]pyridazine have a minimum effective dose (60% supp. of control ADI) mg./kg./day × 5 of about 30.

The following Table I shows the amebicidal activity of representative 6-oxo-, thio- or substituted oxo or thio compounds of the present invention.

TABLE I

The action of imidazopyridazines against experimental intestinal amebiasis in rats
All compounds are tested initially to 0.025% drug concentration in the diet (approximately 30 mg./kg./day × 5)

| Compound | Minimum effective dose (60% supp. of control A.D.I.) mg./kg./day × 5 (diet) |
|---|---|
| 6-Methoxy-3-nitroimidazo-[1,2-b]pyridazine | 7 |
| 6-Ethoxy-3-nitroimidazo-[1,2-b]pyridazine | 27 |
| 6-(2-Dimethylaminoethoxy)-3-nitroimidazo[1,2-b]pyridazine | 74 |
| 6-(2-Ethoxyethoxy)-3-nitroimidazo[1,2-b]pyridazine | 78 |
| 6-(n-Propoxy)-3-nitroimidazo[1,2-b]pyridazine | 20 |
| 6-(2-Hydroxyethoxy)-3-nitroimidazo[1,2-b]pyridazine | 10 |

The present compounds have shown activity as trichomonicides in tests designated to detect this activity. One such test is carried out as follows:

Female albino mice (Royalhart ICR strain) are inoculated subcutaneously with 50,000 to 100,000 *Trichomonas vaginalis* (Thoms strain) suspended in a cysteine-peptone-liver infusion maltose medium described by Garth Johnson and Ray E. Trussell, "Experimental Basis for the Chemotherapy of *Trichomonas vaginalis* Infestations I"; *Proceedings of the Society for Experimental Biology and Medicine* Volume 54, pages 245–249 (1943). In control animals, approximately one week postinoculation, the site of inoculation is marked by a subcutaneous abcess which contains numerous trichomonads in a menstruum of pus. In effectively treated animals the abcesses are either undetectable or greatly reduced in size, and motile trichomonads cannot be detected in the lesion-derived material after prolonged microscopic examination. Pressure of a single motile trichomad after treatment is recorded as a negative result.

Treatment by test drugs consists either of one or more oral doses suspended in 0.2% agar and administered by gavage one day post inoculation, or by administration in the diet for five consecutive days beginning one day postinoculation. The diet is a commercial laboratory feed sold as Purina Lab. Chow by the Ralston-Purina Company. The test compound is mixed thoroughly in the carrier, 0.2% agar, 0.5% carboxymethylcellulose or ground laboratory feed. Each regimen is administered to a test group consisting of five or 10 mice. Control groups of five or 10 mice receive the carrier alone. Gavage doses are estimated for the average mouse weight obtained just before dosing. Drug intakes resulting from diet therapy are estimated for average mouse weights and total group feed intakes during the treatment period. Avtivities of many compounds of the present invention in this test are comparable to that of 2-methyl-5-nitro-1-imidazoleethanol, as well recognized commercial trichomonicide. The following Table II shows the activity against *Trichomonas vaginalis* of representative compounds of the present invention.

TABLE II

The action of representative nitroimidazopyridazines of the present invention against subcutaneous *Trichomonas vaginalis* infections in mice

| Compound | No. Cleared"/No. treated after a single gavage dose of mg./kg. | | | | | |
|---|---|---|---|---|---|---|
| | 100 | 50 | 25 | 12.5 | 6.2 | 3.1 |
| 6-Methoxy-3-nitroimidazo[1,2-b]pyridazine | 1/5 | 10/10 | 30/30 | 20/20 | 29/30 | 17/20 |
| 6-Ethoxy-3-nitroimidazo[1,2-b]pyridazine | — | 10/10 | 4/10 | 9/10 | 15/30 | i" |
| 6-Hydroxy-3-nitroimidazo[1,2-b]pyridazine | 4/10 | — | — | — | — | — |
| 6-Methoxy-2-methyl-3-nitroimidazo[1,2-b]pyridazine | — | 10/10 | 3/18 | — | — | — |
| 6-Methylthio-3-nitroimidazo[1,2-b]pyridazine | — | 6/10 | 0/5 | — | — | — |
| 6-n-Butoxy-3-nitroimidazo[1,2-b]pyridazine | — | — | 8/10 | 6/10 | 3/10 | — |
| 6-Allyloxy-3-nitroimidazo[1,2-b]pyridazine | — | — | 2/5 | — | — | — |
| 6-(2-Dimethylaminoethoxy)-3-nitroimidazo[1,2-b]pyridazine | — | — | 7/10 | 5/10 | 3/10 | — |
| 6-(2-Ethoxyethoxy)-3-nitroimidazo[1,2-b]pyridazine | — | — | 10/10 | 8/10 | 3/10 | — |
| 6-Isopropoxy-3-nitroimidazo[1,2-b]pyridazine | — | — | 8/10 | 0/10 | 2/10 | — |

TABLE II -Continued

The action of representative nitroimidazopyridazines of the present invention against subcutaneous *Trichomonas vaginalis* infections in mice

| Compound | No. Cleared"/No. treated after a single gavage dose of mg./kg. | | | | | |
|---|---|---|---|---|---|---|
| | 100 | 50 | 25 | 12.5 | 6.2 | 3.1 |
| 6-n-Propoxy-3-nitroimidazo[1,2-b]-pyridazine | — | — | 10/10 | 10/10 | 9/10 | 3/10 |
| 6-(2-Hydroxy-ethoxy)-3-nitroimidazo][1,2-b]-pyridazine | — | — | 10/10 | 6/10 | 6/10 | 6/10 |

Compositions containing the 6-mono or 2,6-disubstituted-3-nitroimidazo[1,2-b]pyridazines may be administered to warm-blooded animals orally, or parenterally if desired, and when so administered, may be considered as an agent for therapeutically desirable treatment of amebic or trichomonal infections in daily doses ranging from about 0.5 mg. to about 30 mg. per kilogram. The dosage regimen can be adjusted to provide optimum therapeutic response. Thus, for example, several smaller doses may be administered daily, or the dose may be reduced or increased proportionately as indicated by the requirements or the particular therapeutic situation.

For therapeutic administration the active compounds of this invention may be incorporated with pharmaceutical acceptable carriers such as excipients and used, for example, in the form of tablets, dragees, capsules, suppositories, liquids, elixirs, emulsions, suspensions or the like. Such compositions and preparations should contain at least 0.1% active component. The percentage in the compositions and preparations, may of course, be varied, and may conveniently be between 2% and 60% or more of the weight of the unit. The amount of compound in such therapeutically useful compositions or preparations is such that a suitable dosage will be obtained. Preferred compositions or preparations according to the present invention are prepared so that a dosage unit form contains between about 10 and about 300 milligrams of the active compound. Obviously, in addition to the therapeutic compound, there may be present excipients, binders, fillers and other therapeutically inert ingredients necessary in the formulation of the desired pharmaceutical preparation.

SPECIFIC DESCRIPTION

The following examples describe in detail the preparation of representative compounds of this invention and formulations using said compounds.

EXAMPLE 1

Preparation of
6-Methoxy-3-nitroimidazo[1,2-b]pyridazine

A. Seven grams of 6-methoxyimidazo[1,2-b]pyridazine (J. G. Lombardino, J. Het. Chem. 5 35 (1968)) is added in small portions to 21 ml. of concentrated sulfuric acid, the temperature being held below 10°C. by external cooling. The resultant solution is stirred and the temperature maintained below 13°C. by external cooling as 7.3 ml. of 70% nitric acid is added dropwise. The reaction mixture is allowed to warm to room temperature and stirred for an additional hour. It is then drowned into 150 ml. of ice and water. The pale yellow precipitate is collected, washed free of acid with cold water, and dried. Recrystallization from ethanol gives 4.0 grams of pure product melting at 152.5°–154.5°C.

Analysis: Calcd. for $C_7H_6N_4O_3$: C, 43.30; H, 3.12; N, 28.86. Found: C, 43.16; H, 3.19; N, 29.04.

B. Alternatively, the above compound is prepared by warming equimolar quantities of 6-chloro-3-nitroimidazo[1,2-b]pyridazine and sodium methoxide dissolved in a solvent (such as, methanol, dioxane, dimethylformamide) until completion of the reaction. The solvent is removed under reduced pressure and inorganic salts by washing with water. Purification is carried as described in A above.

C. The subject compound can also be prepared by stirring a suspension of the sodium salt of 6-hydroxy-3-nitroimidazo[1,2-b]pyridazine (Example 3) in dimethylformamide with an excess of methyl iodide until a clear solution is obtained. Isolation and purification is effected as described in A above.

EXAMPLE 2

Preparation of
6-Ethoxy-3-nitroimidazo[1,2-b]pyridazine

The preparation of the subject compound is carried out essentially as described in the procedure of Example 1A, an equivalent of 6-ethoxyimidazo[1,2-b]pyridazine replacing the 6-methoxyimidazo[1,2-b]pyridazine. After recrystallization from ethanol, the compound melts at 149°–151°C.

Analysis: Calcd. for $C_8H_8N_4O_3$: C, 46.15; H, 3.87; N, 26.92. Found: C, 46.13; H, 3.78; N, 27.00.

EXAMPLE 3

Preparation of
6-Hydroxy-3-nitroimidazo[1,2-b]pyridazine

A solution of 5.4 grams of 6-hydroxyimidazo[1,2-b]pyridazine in 50 ml. of concentrated sulfuric acid is stirred at room temperature as 5 ml. of red fuming nitric acid is added dropwise. The mixture is then stirred and heated on the steam bath for 6 hours. After cooling to room temperature, the solution is poured into 500 grams of ice and water. The pale yellow precipitate is collected, washed free of acid, and dried. Recrystallization from a mixture of ethanol and dimethylformamide gives 2.8 grams of pure product, melting at 305°–310°C. with decomposition.

Alternatively, the subject compound is prepared by heating the compound of Example 1 with 48% hydrobromic acid at reflux for 16 hours, followed by removal of the aqueous acid under reduced pressure, and purification of the residue as described above.

Analysis: Calcd. for $C_6H_4N_4O_3$: C, 40.01; H, 2.24; N, 31.11. Found: C, 39.55; H, 2.16; N, 30.96.

EXAMPLE 4

Preparation of
6-Methoxy-2-methyl-3-nitroimidazo[1,2-b]pyridazine

The title compound is prepared essentially by the procedure of Example 1A an equivalent of 6-methoxy- 2-methylimidazo[1,2-b]pyridazine (prepared as described by J. G. Lombardino, J. Het. Chem. 5 35 (1968)) replacing the 6-methoxyimidazo[1,2-b]pyridazine. Recrystallization from ethanol gives the pure compound, melting at 170°–173°C.

Analysis: Calcd. for $C_8H_8N_4O_3$: C, 46.15; H, 3.87; N, 26.92. Found: C, 46.14; H, 4.04; N, 27.01.

EXAMPLE 5

Preparation of
6-Methylthio-3-nitroimidazo[1,2-b]pyridazine

Methyl mercaptan is bubbled through a solution of 0.6 gram of sodium methoxide in 50 ml. of methanol for 15 minutes. Two grams of 6-chloro-3-nitroimidazo[1,2-b]pyridazine is then added, and the mixture placed in a stoppered flask and stirred for 2 hours. The precipitate present is collected, washed with water, dried, and recrystallized from ethanol to give the pure compound, melting at 174°–176°C.; yield, 1.9 grams.

Analysis: Calcd. for $C_7H_6N_4SO_2$: C, 40.00; H, 2.88; N, 26.66. Found: C, 40.24; H, 2.91; N, 26.91.

EXAMPLE 6

Preparation of
6-n-Butoxy-3-nitroimidazo[1,2-b]pyridazine

One and six-tenths grams of 50% sodium hydroxide dispersion in mineral oil is added to 100 ml. of n-butanol, and the mixture stirred until complete solution is effected. 6.0 grams of 6-chloro-3-nitroimidazo[1,2-b]pyridazine is then added to the solution, and the mixture is stirred at room temperature until the reaction is completed. The precipitate is collected, washed with water, and dried. Recrystallization from methanol gives the pure compound, melting at 85°–88°C.; yield, 3.8 grams.

Analysis: Calcd. for $C_{10}H_{12}N_4O_3$: C, 50.84; H, 5.12; N, 23.72. Found: C, 50.47; H, 5.09; N, 23.82.

EXAMPLE 7

Preparation of
6-Benzyloxy-3-nitroimidazo[1,2-b]pyridazine

One and six-tenths grams of 50% sodium hydride dispersion in mineral oil is added to a solution of 3.45 ml. of benzyl alcohol in 100 ml. of dioxane. The mixture is stirred at room temperature until gas evolution ceases. 6.0 grams of 6-chloro-3-nitroimidazo[1,2-b]pyridazine is added to the mixture, which is stirred until reaction is completed. The precipitate is collected, washed with water, and dried. Recrystallization from ethanol gives 1.9 grams of the pure compound, melting at 155.5°–157.5°C.

Analysis: Calcd. for $C_{13}H_{10}N_4O_3$: C, 57.77; H, 3.37; N, 20.73. Found: C, 58.13; H, 3.72; N, 20.99.

EXAMPLE 8

Preparation of
6-(Carbethoxymethoxy)-3-nitroimidazo[1,2-b]pyridazine

A stirred solution of 7.2 grams of 6-hydroxy-3-nitroimidazo[1,2-b]pyridazine (Example 3) in 200 ml. of dry dimethylformamide is treated with 2.5 grams of 95% sodium methoxide. After fifteen minutes, the thick yellow suspension of the sodium salt of the starting compound is treated with 7.5 ml. (excess) of ethyl bromoacetate. A clear solution is obtained in 2 hours. After stirring for an additional fourteen hours, the solution is concentrated to dryness under reduced pressure. Inorganic salts are removed by extraction with 250 ml. of water. The insoluble residue is recrystallized from ethanol, yielding 7.6 grams of the subject compound, melting at 123°–124°C.

Analysis. calcd. for $C_{10}H_{10}N_4O_5$: c, 45.11; H, 3.79; N, 21.05. Found: C, 44.80; H, 3.73; N, 21.39.

EXAMPLE 9

Preparation of
6-Allyloxy-3-nitroimidazo[1,2-b]pyridazine

The above compound is prepared essentially by the procedure of Example 8, 4.9 grams of allyl bromide replacing the ethyl bromoacetate. After recrystallization from ethanol, 4.1 grams of pure compound is obtained, melting at 124°–125°C.

Analysis Calcd. for $C_9H_8N_4O_3$: C, 49.09; H, 3.66; N, 25.44. Found: C, 48.30; H, 3.52; N, 25.62.

EXAMPLE 10

Preparation of
6-(p-Chlorophenacyloxy)-3-nitroimidazo[1,2-b]pyridazine

The subject compound is prepared essentially by the procedure of Example 8, 7.3 grams of 2-bromo-4'-chloroacetaphenone replacing the ethyl bromoacetate. After recrystallization from a mixture of ethanol and dimethylformamide, 4.7 grams of the pure compound is obtained, melting at 223°–225°C. with decomposition. Analysis Calcd. for $C_{14}H_9N_4O_4Cl$: C, 50.54; H, 2.73; Cl, 10.66. Found: C, 50.63; H, 2.67; Cl, 11.06.

EXAMPLE 11

Preparation of 1,2-Bis(3-nitroimidazo[1,2-b]pyridazine-6-yloxy)-ethane

The subject compound is prepared essentially by the procedure of Example 8, 3.7 grams of 1,2-dibromoethane replacing the ethyl bromoacetate. After recrystallization from a mixture of ethanol and dimethylformamide, the product melts at 257°–259°C. with decomposition.

Analysis Calcd. for $C_{14}H_{10}N_8O_6$: C, 43.33; H, 2.61; N, 29.01. Found: C, 43.70; H, 2.82; N, 29.50.

EXAMPLE 12

Preparation of
6-(2-Ethoxyethoxy)-3-nitroimidazo[1,2-b]pyridazine

The subject compound is prepared essentially by the procedure of Example 8, 5.6 grams of 2-bromodiethylether replacing the ethyl bromoacetate. After recrystallization from ethanol, 3.9 grams of pure product is obtained, melting at 125°–126°C.

Analysis Calcd. for $C_{10}H_{12}N_4O_4$: C, 47.62; H, 4.80; N, 22.21. Found: C, 47.56; H, 4.55; N, 22.45.

EXAMPLE 13

Preparation of
6-(2-Dimethylaminoethoxy)-3-nitroimidazo[1,2-b]pyridazine hydrochloride The free base of the subject compound is prepared essentially by the procedure of Example 7, 3.0 grams of 2-dimethylamino ethanol replacing the benzyl alcohol. This is dissolved in acetone and treated with a slight excess of hydrogen chloride in isopropanol solution. The resultant yellow precipitate is recrystallized from methanol to yield 2.3 grams of the pure compound, melting at 223°–226°C. (with decomposition). Analysis Calcd. for $C_{10}H_{13}N_5O_3 \cdot HCl$: C, 41.74; H, 4.90; N, 24.34; Cl, 12.32. Found: C, 41.81; H, 4.99; N, 24.25; Cl, 12.55.

EXAMPLE 14

Preparation of 6n-Propyloxy-3-nitroimidazo[1,2-b]pyridazine

The above compound is prepared essentially by the procedure of Example 6, 100 ml. of N-propanol replacing the N-butanol. Recrystallization of the product from 400 ml. of methanol gives 4.7 grams of the pure compound, melting at 161°–164°C.

Analysis: Calcd. for $C_9H_{10}N_4O_3$: C, 48.65; H, 4.54; N, 25.27. Found: C, 48.61; H, 4.52; N, 25.44.

EXAMPLE 15

Preparation of 6-Iso-Propyloxy-3-nitroimidazo[1,2-b]pyridazine

The subject compound is prepared essentially by the procedure of Example 6, 100 ml. of iso-propanol replacing the N-butanol. Recrystallization from 200 ml. of methanol gives 4.5 grams of the pure compound, melting at 154°–157°C.

Analysis: Calcd. for $C_9H_{10}N_4O_3$: C, 48.65; H, 4.54; N, 25.22. Found: C, 48.61; H, 4.43; N, 25.47.

EXAMPLE 16

Preparation of 6-(2-Hydroxyethoxy)-3-nitroimidazo[1,2-b]pyridazine

The above compound is prepared essentially by the procedure described in Example 8. An equivalent of 2-bromoethanol replacing the ethyl bromoacetate. The reaction is brought to completion by a final heating on the steam bath for 45 minutes. Recrystallization from 250 ml. of ethanol gives 4.0 grams of the pure compound, melting at 178°–180°C.

Analysis: Calcd. for $C_8H_8N_4O_4$: C, 42.86; H, 3.60; N, 24.99. Found: C, 42.73; H, 3.53; N, 24.69.

EXAMPLE 17

Preparation of 6-n-Octyloxy-3-nitroimidazo[1,2-b]pyridazine

The subject compound is prepared by the procedure described in Example 8, an equivalent of 1-bromooctane replacing the ethyl bromoacetate. The reaction is brought to completion by a final heating for 2 hours on the steam bath. Recrystallization from 150 ml. of ethanol gives 3.1 grams of the pure compound, melting at 65°–67°C.

Analysis: Calcd. for $C_{14}H_{20}N_4O_3$: C, 57.52; H, 6.90; N, 19.17. Found: C, 57.15; H, 6.80; N, 19.16.

EXAMPLE 18

Preparation of 3-Nitro-6-(2-phthalimidoethoxy)imidazo[1,2-b]pyridazine

The above compound is prepared essentially by the procedure of Example 8, an equivalent of N-(2-bromoethyl)phthalimide replacing the ethyl bromoacetate. The reaction is brought to completion by heating on the steam bath for 4 hours. Recrystallization from 250 ml. of 2-methoxyethanol gives 2.9 grams of purified compound, melting at 260°–265°C. with decomposition.

Analysis: Calcd. for $C_{16}H_{11}N_5O_5$: C, 54.39; H, 3.14; N, 19.82. Found: C, 53.93; H, 3.08; N, 19.51.

EXAMPLE 19

Preparation of Hard Shell Capsules containing 6-methoxy-3-nitroimidazo[1,2-b]pyridazine

| | Per 1000 Capsules g. |
|---|---|
| 6-methoxy-3-nitroimidazo-[1,2-b]pyridazine | 200.0 |
| Lactose | 900.0 |
| Magnesium stearate | 10.0 |

The ingredients are blended together. The mixture is used to fill hard shell capsules of a suitable size each containing 200 mg. of active compound.

EXAMPLE 20

Preparation of Tablet Compositions containing 6-n-butoxy-3-nitroimidazo[1,2-b]pyridazine

| | Per 1000 Tablets g. |
|---|---|
| 6-n-butoxyimidazo[1,2-b]-pyridazine | 100.0 |
| Corn starch USP | 300.0 |
| Dibasic calcium phosphate | 2150.0 |
| Magnesium stearate | 600.0 |

EXAMPLE 21

Suppositories containing 6-n-propoxy-3-nitroimidazo[1,2-b]pyridazine

| | 30 suppositories g. |
|---|---|
| 6-n-propoxy-3-nitro-imidazo[1,2-b]pyridazine | 15 |
| Purified water qsAD | 20 |
| Gelatin granular | 40 |
| Glycerin | 140 |

Add the water to the medicinal substance to make 20 g. and dissolve or mix together. Add the glycerine and mix well. To the mixture add the gelatin carefully avoiding incorporation of air and heat on steam bath until gelatin is dissolved. Pour the melted mixture into 30 chilled molds and allow to congeal. Each suppository contains 500 mg. of therapeutic component.

EXAMPLE 22

Preparation of Hard Shell Capsules containing 6-(2-hydroxyethoxy)-3-nitroimidazo[1,2-b]pyridazine

| | Per 1000 Capsules g. |
|---|---|
| 6-(2-hydroxyethoxy)-3-nitroimidazo[1,2-b]-pyridazine | 200.0 |
| Lactose | 900.0 |
| Magnesium stearate | 10.0 |

The ingredients are blended together. The mixture is used to fill hard shell capsules of a suitable size each containing 200 mg. of active component.

EXAMPLE 23

Preparation of Tablet Compositions Containing 6-ethoxy-3-nitroimidazo[1,2-b]pyridazine

|  | per 1000 Tablets g. |
|---|---|
| 6-ethoxy-3-nitroimidazo-[1,2-b]pyridazine | 100.0 |
| Corn starch USP | 300.0 |
| Dibasic calcium phosphate | 2150.0 |
| Magnesium stearate | 600.0 |

The above ingredients are thoroughly mixed and incorporated into a standard pharmaceutical tablet. Each tablet contains 100 mg. of therapeutic component.

We claim:

1. A nitroimidazopyridazine of the formula:

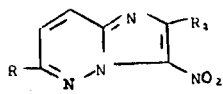

wherein R is hydroxy, $C_1-C_8$ alkoxy, methylthio, phthalimido $C_1-C_4$-alkoxy, phenyl $C_1-C_4$ alkoxy, $C_1-C_4$-dialkaylamino-$C_1-C_4$-alkoxy, mono-$C_1-C_4$-alkoxy-$C_1-C_4$-alkoxy, monohydroxy-$C_1-C_4$-alkoxy, or allyloxy and $R_1$ is hydrogen or $C_1-C_4$ alkyl.

2. The nitroimidazopyridazine in accordance with claim 1, 6-(2-hydroxyethoxy)-3-nitroimidazo[1,2-b]pyridazine.

3. The nitroimidazopyridazine in accordance with claim 1, 6-methoxy-3-nitroimidazo[1,2-b]pyridazine.

4. The nitroimidazopyridazine in accordance with claim 1, 6-n-propoxy-3-nitroimdazo[1,2-b]pyridazine.

5. The nitroimidazopyridazine in accordance with claim 1, 6-ethoxy-3-nitroimidazo[1,2-b]pyridazine.

6. The nitroimidazopyridazine in accordance with claim 1, 6-n-butoxy-3-nitroimidazo[1,2-b]pyridazine.

7. The nitroimidazopyridazine in accordance with claim 1, 6-hydroxy-3-nitroimidazo[1,2-b]pyridazine.

8. The nitroimidazopyridazine in accordance with claim 1, 6-isopropoxy-3-nitroimidazo[1,2-b]pyridazine.

9. The nitroimidazopyridazine in accordance with claim 1, 6-ethoxyethoxy-3-nitroimidazo[1,2-b]pyridazine.

* * * * *